United States Patent
Shukla et al.

(10) Patent No.: US 12,103,269 B2
(45) Date of Patent: Oct. 1, 2024

(54) HIGH-ENTROPY SURFACE COATING FOR PROTECTING METAL DOWNHOLE

(71) Applicant: Halliburton Energy Services, Inc., Houston, TX (US)

(72) Inventors: Shashwat Shukla, Singapore (SG); Arpana Singh, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 99 days.

(21) Appl. No.: 17/966,416

(22) Filed: Oct. 14, 2022

(65) Prior Publication Data
US 2024/0123706 A1    Apr. 18, 2024

(51) Int. Cl.
| | | |
|---|---|---|
| *B32B 15/01* | (2006.01) | |
| *B22F 10/25* | (2021.01) | |
| *B33Y 10/00* | (2015.01) | |
| *B33Y 70/00* | (2020.01) | |

(52) U.S. Cl.
CPC ............ *B32B 15/017* (2013.01); *B22F 10/25* (2021.01); *B33Y 10/00* (2014.12); *B33Y 70/00* (2014.12)

(58) Field of Classification Search
None
See application file for complete search history.

(56) References Cited

U.S. PATENT DOCUMENTS

| | | | |
|---|---|---|---|
| 2020/0149143 A1 | 5/2020 | Chen et al. | |
| 2021/0222274 A1* | 7/2021 | Kim | C22C 30/02 |
| 2022/0097133 A1 | 3/2022 | Liu et al. | |

FOREIGN PATENT DOCUMENTS

| | | |
|---|---|---|
| CN | 104561990 A | 4/2015 |
| CN | 110158008 A | 8/2019 |
| CN | 110273153 A | 9/2019 |
| CN | 112195463 A | 1/2021 |
| CN | 114196952 A * | 3/2022 |
| CN | 114642363 A | 6/2022 |
| WO | 2022260675 A1 | 12/2022 |

OTHER PUBLICATIONS

Jin et al., machine translation of CN 114196952, Mar. 18, 2022 (Year: 2022).*
Boakye et al., Development of High Velocity Oxygen Fuel Corrosion Resistant Coatings; A Comparison between Novel High Entropy Alloy and Conventional Cermet Coatings for Geothermal Applications, Mar. 6, 2022 (Year: 2022).*
Li et al., Effects of Mn, Ti and V on the microstructure and properties of AlCrFeCoNiCu high entropy alloy, 2008, Materials Science and Engineering A, pp. 482-486 (Year: 2008).*
Search Report, NL2035618, Jan. 12, 2024, 13 Pages.
Arif et al., A review on Laser Cladding of Highentropy Alloys, Their Recent Trends and Potential Application, Journal of Manufacturing Processes, vol. 68, Jul. 7, 2021, pp. 225-273.
International Search Report and Written Opinion, PCT/US2022/046813, Jul. 5, 2023, 10 pages.

* cited by examiner

*Primary Examiner* — Mary I Omori
(74) *Attorney, Agent, or Firm* — Kilpatrick Townsend & Stockton LLP (57) ABSTRACT

A metal can include a metallic substrate and an alloy coating. The alloy coating may have a higher entropy than the entropy of the metallic substrate. The alloy coating may coat an external surface of the metallic substrate. The metal coated by the higher entropy alloy on an external surface of the metallic substrate may serve to increase resistance of the metal to hydrogen-induced cracking in a downhole environment.

19 Claims, 4 Drawing Sheets

HIGH-ENTROPY SURFACE COATING FOR PROTECTING METAL DOWNHOLE

TECHNICAL FIELD

The present disclosure relates generally to wellbore operations and, more particularly (although not necessarily exclusively), high-entropy surface coatings for protecting metal downhole.

BACKGROUND

A well system, such as an oil and gas well system or a storage well, can include a wellbore drilled through a subterranean formation for storing elements or extracting hydrocarbons and other elements from a reservoir. Components, such as metal components, can be positioned in the wellbore for various purposes, including for performing drilling, completion, production, or storage operations. Certain elements, whether stored in the wellbore or naturally being present in a wellbore for extracting other elements, can have detrimental effects on the integrity of the components positioned in the wellbore for various purposes. One example is that hydrogen can include cracking in metallic components, which can affect the strength or longevity of components in the well system.

DETAILED DESCRIPTION

Certain aspects and examples of the present disclosure relate to coating an external surface of a metallic substrate with a high-entropy alloy to increase resistance to hydrogen-induced cracking in a downhole environment. For example, some downhole environments, such as in hydrogen storage wells, have hydrogen or other elements present at levels that can cause the metallic substrate to degrade. The high-entropy alloy may be an alloy having a higher entropy than the metallic substrate that the high-entropy alloy is coating. The metallic substrate can be a steel component that may be susceptible to cracking from being exposed to hydrogen. By using a high-entropy alloy according to some examples on an external surface of metallic substrate, cracking of the metallic substrate in the downhole environment can be reduced or eliminated, and hydrogen diffusion can be suppressed.

Wells, such as a hydrogen storage well, can include metallic components that may be susceptible to hydrogen embrittlement and hydrogen-induced cracking. Although metallic components have a high strength, the higher strength can result in a decreased strength to hydrogen or other elements causing the metallic components to degrade. In one example, a high-entropy alloy can coat a metallic substrate that is a high-strength steel to provide an effective barrier for preventing hydrogen from permeating to the metallic component. An example of a high-strength steel is one with 80 ksi minimum yield or 125 ksi minimum yield. The high-entropy alloy may have a higher organizational or atomical entropy than the organizational or atomical entropy of the metallic substrate. As an example, the entropy of the high-entropy alloy can be in a range of 10 J/mol*K to 20 J/mol*K. One example of a high-entropy alloy is one that includes nickel, aluminum, cobalt, chromium, and iron, each forming at least 5 atomic weight percent or greater. In other examples, the alloy may also include boron in a range of 0.01-0.25 atomic weight percent. In another example to either of these examples, aluminum may be present in at least 6.6 atomic weight percent and the other elements present in the atomic weight percentages specified previously. By using a high-entropy alloy according to certain examples, the metallic substrate can be selected that has a more reasonable cost and more typical performance characteristics.

The high-entropy alloy coating can be positioned on the external surface of the metallic substrate to provide increased protection against hydrogen-induced cracking. In one example, a double-layered high-entropy alloy coating positioned on the metallic substrate may further provide increased protection against hydrogen-induced cracking. The high-entropy alloy coating may be formed on the metallic substrate in one of multiple different processes. An example of a process for forming the high-entropy alloy coating on the metallic substrate is a directed energy deposition process. The directed energy deposition process may facilitate a strong metallurgical bond with the metallic substrate without chemically altering or affecting the metallic substrate's microstructure or mechanical properties. The strong metallurgical bond formed may form in the as-deposited state, since post-deposition heat treatment can alter or make soft the microstructure of the metallic substrate.

In a directed energy deposition process according to some examples, a feedstock of an atomized powder form of the high-entropy alloy can be proximally positioned to a directed energy deposition system. Using a gas such as argon, the atomized powder can be transferred and directed to a laser head. The atomized powder may then be heated from a laser in the laser head to generate a molten powder. The molten powder can be directed onto the external surface of the metallic substrate for deposition, forming the high-entropy alloy coating. The high-entropy alloy coating may form without a post-process heat treatment. Further, the external surface of the metallic substrate forgoes heat, maintaining structural integrity.

Additionally, or alternatively, other processes may be used for forming the high-entropy alloy coating on the external surface of the metallic substrate. An example of another process may include selective laser melting or selective laser sintering, where an already positioned bed of powder is integrated into the metallic substrate through a heat source such as a laser. Another example may include an electron beam melting process where a metal powder is melted onto an external surface of a metal in a vacuum using a high-power electron beam heat source. Alternative processes of coating may eschew heat altogether through accelerating particles of a powder through a gas onto the metal. Yet other examples of processes for coating may be used as well.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
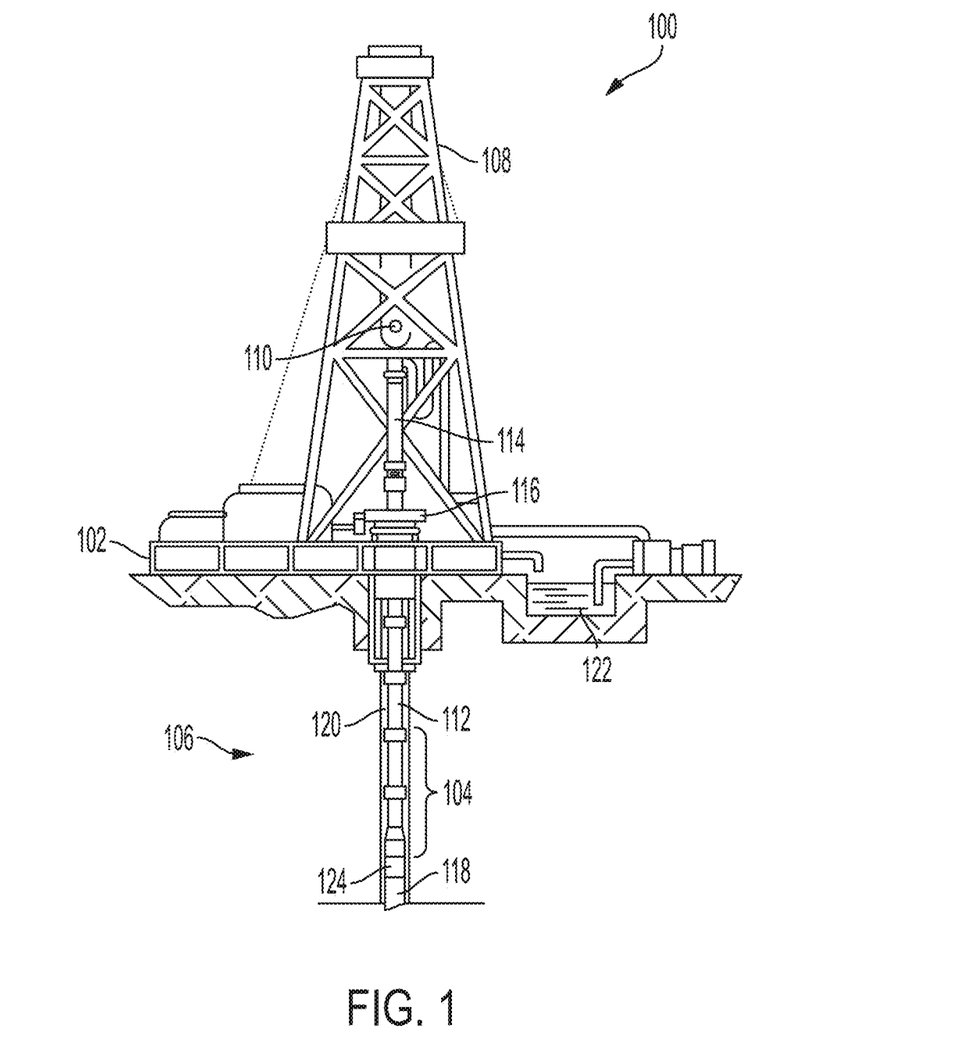
FIG. 1 is a schematic of an example of a wellbore system that can include one or more metallic components with a high-entropy alloy coating an external surface according to one example of the present disclosure.

FIG. 1 is a schematic of an example of a wellbore system 100 that can include one or more metallic components with a high-entropy alloy coating 124 an external surface according to one example of the present disclosure. The wellbore system 100 includes a drilling platform 102 positioned at the surface for creating a wellbore 104 extending through a subterranean formation 106. In other examples, such as in an offshore drilling operation, a volume of water may separate the drilling platform 102 and the wellbore 104. Although FIG. 1 depicts a land-based drilling platform 102, examples of the present disclosure can be used in other types of drilling platforms, such as offshore platforms, or rigs used in any other geographical locations. The wellbore 104 may be vertical, horizontal, or deviated.

The wellbore system 100 may include a derrick 108, supported by the drilling platform 102, and a traveling block 110 for raising and lowering a conveyance 112, such as a drill string. A kelly 114 may support the conveyance 112 as it is lowered through a rotary table 116. A drill bit 118 may be coupled to the conveyance 112 and driven by a downhole motor or by rotation of the conveyance 112 by the rotary table 116. As the drill bit 118 rotates, it creates the wellbore 104, which penetrates the subterranean formations 106. A pump may circulate drilling fluid downhole through the interior of the conveyance 112, through orifices in the drill bit 118, back to the surface via an annulus 120 defined around conveyance 112, and into a retention pit 122. The drilling fluid may be used to cool the drill bit 118 during operation and may also be used to transport debris from the wellbore 104 into the retention pit 122.

In one example, the high-entropy alloy coating 124 may be used as part of a wellbore installation. The wellbore installation can include completion equipment for producing a wellbore and may involve various components and tools. The high-entropy alloy coating 124 may coat an external surface of various metallic components and tools to increase resistance against hydrogen-induced cracking downhole or otherwise. Such components and tools can include housings, production tubing, mandrels, tubing, shunt tubes, wyes, fracturing tools, multilateral junctions, cross over tools, sand screens, packers, flow control valves, inflow control valves, inflow control devices, subsurface safety valves, surface safety valves, rate limiting valves, sleeves, baffles, and other components of the like that may be exposed to high concentrations of hydrogen. Generally, the high-entropy alloy coating 124 may be used for production and injection, of hydrogen where concentrations of hydrogen may be high. Within injection and gas storage uses, examples of the high-entropy alloy coating 124 may include coating an external surface of any downhole tubing, casing, drill pipe, tool joints, wirelines, components of valves and related equipment items, landing nipples, wellhead components, vessels, storage containers, heat exchangers, and any combination thereof.

Additionally, the high-entropy alloy coating 124 may be used for tools and components involved in a gas storage tank or a hydrogen storage well, where concentrations of hydrogen may be high. A gas storage tank or a hydrogen storage well may contain several types of natural gasses including hydrocarbon and hydrogen gas. The gas storage tank or the hydrogen storage well may be tailored to store a gas underground or above ground. Examples of underground gas storage tanks and wells may include natural oil and gas reservoirs, salt caverns, aquifers, and others of the like. A tank or a well's tools and components' composition may vary according to the gas stored. Porosity, retention capacity, and permeability may be physical characteristics that may change according to the gas stored. The gas storage tank or hydrogen storage well for storing hydrogen gas or hydrogen liquid may contain components and tools coated with the high-entropy alloy coating 124 to protect any interior metallic components.

Figure 2:
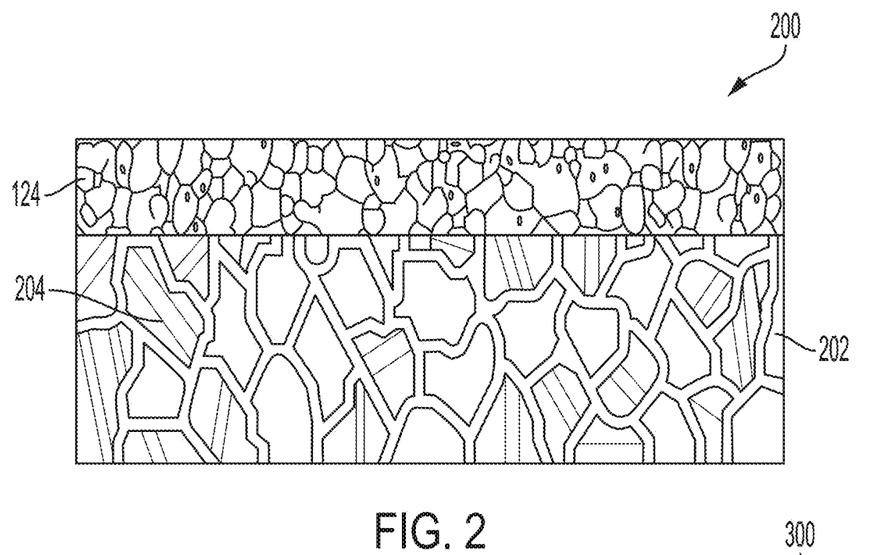
FIG. 2 is a cross-sectional view of an example of a layered metal that includes a metallic substrate with a high-entropy alloy coating an external surface of the metallic substrate according to one example of the present disclosure.

FIG. 2 is a cross-sectional view of an example of a layered alloy 200 that includes a metallic substrate 202 with the high-entropy alloy coating 124 positioned on an external surface of the metallic substrate 202 according to one example of the present disclosure. The high-entropy alloy coating 124 that coats the metallic substrate 202 may contain a higher entropy than the metallic substrate 202. The entropy of the metallic substrate 202 may vary according to a composition of the metallic substrate 202. The metallic substrate 202 may be a low-alloy, high-strength steel component that may be susceptible to cracking due to exposure to hydrogen. Examples of alloys of metallic substrates may include stainless-steels, carbon-steels, and other alloy steels of the like. In particular, one example of an alloy for a metallic substrate may include a strengthened Ni-base superalloy that may include nickel, chromium, iron, molybdenum, niobium, and tantalum each at an atomic weight percent of at least 2, and nickel at an atomic weight percent greater than 57. The strengthened Ni-base superalloy may or may not contain boron or aluminum.

The entropy of an alloy may correspond to the alloy's stacking fault energy. For example, a low-entropy alloy may contain a low stacking fault energy of less than 25 mJ/m$^2$, while a high-entropy alloy may contain a high stacking fault energy of up to 400 mJ/m$^2$. Conversely, the stacking fault energy of a metal may not correspond accordingly. For example, a low-entropy alloy may contain a high stacking fault energy, while a high-entropy allow may contain a low stacking fault energy. The stacking fault energy of less than 40 mJ/m$^2$ of the metallic substrate 202 may correspond to an entropy of 8.4 J/mol*K or lower. Conversely, the higher stacking fault energy of the high-entropy alloy coating 124 may correspond to an entropy in a range of 10 J/mol*K to 20 J/mol*K.

A property of the metallic substrate 202 may include twin boundaries. A twin boundary 204 may occur when two crystal lattices of the same type intergrow so that a slight misorientation exists between them. The twin boundary 204 may be considered as a coherent twin boundary, a mirror twin boundary, a twist twin boundary, a tilt twin boundary. The twin boundary 204 may be characterized as a low angle grain boundary where the misorientation is less than about 20 degrees or a lower angle grain boundary where the misorientation is less than about 10 degrees. Further, twin boundaries can be measured by electron backscatter diffraction.

A metallic substrate's stacking fault energy may also correspond with twin boundaries 204, a characteristic that promotes crack formation. For example, a high stacking fault energy may reduce twin boundaries 204, while a low stacking fault energy may increase the formation of twin boundaries 204. Thus, twin boundaries 204 may correspond to entropy as well. The high-entropy alloy coating 124, corresponding to a high stacking fault energy, may contain a low density of twin boundaries, and thereby, a decrease in crack formation. Conversely, the metallic substrate 202, corresponding to a low stacking fault energy, may contain a higher density of twin boundaries 204 than the high-entropy alloy coating 124. The high density of twin boundaries 204 in the metallic substrate 202 may promote crack formation.

The high-entropy alloy coating 124 composition may include one or more elements. In some examples, the high-entropy alloy coating 124 includes at least five or more elements. In one example, the elements may be equimolar or near equimolar in concentration. Alternatively, the elements may be in a concentration range of 5 to 35 atomic weight percent. Elements may be metals and metalloids from the periodic table of elements. Elements that may be suitable for the high-entropy alloy coating 124 may include manganese, chromium, iron, cobalt, nickel, copper, silver, tungsten, molybdenum, niobium, aluminum, cadmium, tin, lead, bismuth, zinc, silicon, magnesium, germanium, antimony, and others of the like in any derivation or combination thereof. In one example, elements that make up the high-entropy alloy may contain nickel, aluminum, cobalt, chromium, and iron in at least 5 atomic weight percent or greater and aluminum at 6.6 atomic weight percent or greater. Alternatively or additionally, the high-entropy alloy coating 124 may include both aluminum in a 11.1 atomic weight percent or greater and boron in a range of 0.01 to 0.25 atomic weight percent such that a crystal lattice distortion is generated. In another example, elements that make up the high-entropy alloy may contain nickel, aluminum, cobalt, chromium, and iron in at least equimolar ratio concentrations.

A crystal lattice structure or a crystal structure may refer to a material's smallest unit of element organization. The crystal lattice structure may vary depending on the material's composition. In one example, the various elements may be organized in a face-centered cubic (FCC) crystal lattice structure to increase a packing density to reduce interstitial sites between atoms. Alternatively, the various elements could be organized in other crystal lattice structures such as a body-centered cubic (BCC) crystal lattice structure, or a hexagonal close packed (HCP) crystal lattice structure. In addition, the high-entropy alloy coating 124 may not contain intermetallic phases.

Interstitial sites refer to spaces or gaps among atoms in a crystal lattice where packing may not be uniform. In some metals, hydrogen uses the interstitial sites to traverse from one site to another site within the metal. The high-entropy alloy coating 124 may contain more elements with different types of atoms that differ in size and electronic structure that may distort the lattice and create new packing sequences. Because a presence of different atoms, which differ in size and electronic structure, may distort the high-entropy alloy's crystal lattice, packing sequences may generate different sized interstitial spaces between the atoms. In the high-entropy alloy coating 124, where interstitial spaces may be smaller, hydrogen diffusion may be reduced or prevented.

Thus, by adding suitable elements to increase a material's respective entropy, lattice distortion, as a result, can aid to suppress hydrogen ingress.

In other examples, an additional external layer may be applied to the high-entropy alloy coating 124. The additional external layer may comprise of a suitable nanomaterial, such as reduced graphene oxide, metals, and any combination thereof. In one example, the additional outer layer may contain MAX phases, including ternary carbides or nitrides such as $Ti_2AlN$. MAX phases may be a group of layered ternary metal carbides, nitrides, and carbonitrides. MAX phases may reference to the chemical composition: Mn+1AXn (n=1, 2, or 3), where M is an early transition metal, A is an A group element, and X is carbon and/or nitrogen. The additional external layer may be a coating of a ceramic material, such as $Al_2O_3$. The additional outer layer may be formed using additive manufacturing, physical or chemical vapor deposition techniques.

Figure 3:
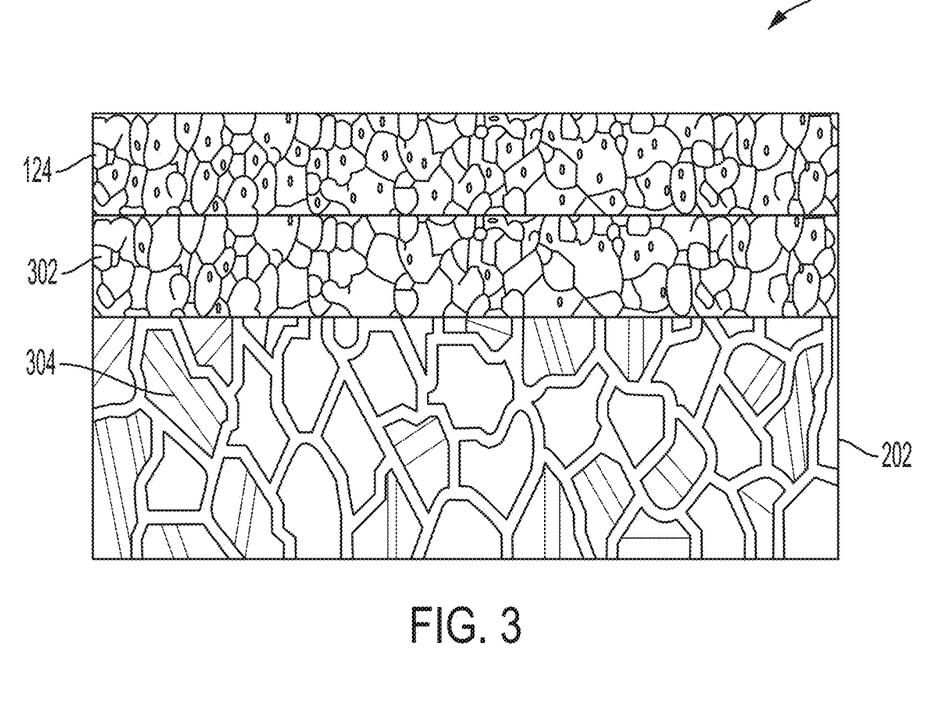
FIG. 3 is a cross-sectional view of an example of a multi-layered alloy that includes a metallic substrate with a high-entropy alloy coating an external surface of a lower-entropy alloy coating an external surface of the metallic substrate according to one example of the present disclosure.

Although FIG. 2 depicts the high-entropy alloy coating 124 as a single layer, other examples can involve multiple layers. FIG. 3 is a cross-sectional view of an example of a multi-layered alloy 300 that includes a metallic substrate 202 with the high-entropy alloy coating 124 positioned on an external surface of a lower-entropy alloy coating 302 the external surface of the metallic substrate 202 according to one example of the present disclosure. Additionally or alternatively, the lower-entropy alloy coating 302 on the metallic substrate 202 may provide increased resistance against hydrogen-induced cracking over one layer of the high-entropy alloy coating 124 when deployed in a downhole environment. Two alloy coatings, both having a greater entropy than the metallic substrate 202, may be used in conjunction to decrease diffusion of hydrogen ingress.

A first, external layer, the high-entropy alloy coating 124, may be exposed to hydrogen and can be utilized to suppress hydrogen diffusion and initiation of cracks. The first, external layer may contain a composition and microstructure that corresponds to a high stacking fault energy in the range of 25 to 400 $mJ/m^2$ such that twin boundary density may be lower than the density of the twin boundaries 304 of the metallic substrate 202. The high-entropy alloy coating 124 composition may include various elements with at least five elements. Elements may include nickel, aluminum, cobalt, chromium, and iron in at least 5 atomic weight percent or greater and aluminum at 6.6 atomic weight percent or greater. Boron may be included in a range of 0.01 to 0.25 atomic weight percent. The various elements may be organized in a face-centered cubic (FCC) crystal lattice structure with an entropy in a range of 10 J/mol*K to 20 J/mol*K. In other examples, alternative compositions of the high-entropy alloy coating 124 may contain more than 5 atomic weight percent of nickel, aluminum, cobalt, chromium, iron while additionally, comprising 11.1 atomic weight percent of aluminum. In the other examples, the high-entropy alloy coating 124 may be organized in a body-centered cubic (BCC) crystal lattice structure or in a combination of body-centered cubic and face-centered cubic (FCC) crystal lattice structures.

A second, middle layer, the lower-entropy alloy coating 302, may be positioned between the first, external layer, the high-entropy alloy coating 124, and the metallic substrate 202. The lower-entropy alloy coating 302 can be utilized to further suppress hydrogen diffusion in addition to attenuating crack propagation from the first, external layer. The lower-entropy alloy coating 302 may contain a composition and microstructure that corresponds to a low stacking fault energy lower than 25 $mJ/m^2$ such that twin boundary density may be higher than the density of the high-entropy alloy coating 124, as well as that of the metallic substrate 202. The stacking fault energy may contribute to a formation of multiple twin boundaries. The lower-entropy alloy coating 302 may have an entropy lower than the high-entropy alloy coating 124, but higher than the metallic substrate 202. The entropy of the lower-entropy alloy coating 302 may be in a range of 9 J/mol*K to 15 10 J/mol*K. The lower-entropy alloy coating 302 may contain a combination of elements of nickel, chromium, vanadium, and cobalt in equimolar proportion.

The multi-layered alloy 300 may be formed by a directed energy deposition process. After deposition of the lower-entropy alloy coating 302 onto the metallic substrate 202, the metallic substrate 202 may be subjected to plastic deformation using laser shock peening to induce twining. The high-entropy alloy coating 124 may then be deposited positionally onto the lower-entropy alloy coating 302. Alternative methods to plastic deformation may include deep cold rolling, shot-peening, hammer-peening, and others of the like.

Alternatively, the feedstock powder for the directed energy deposition process may be alloyed in-situ by laser melting that may use individual elements or pre-alloyed combinations. Processes for coating the multi-layered alloy 300 may involve other manufacturing methods such as selective laser melting, selective laser sintering, electron beam melting, wire and arc AM, cold spray, and others of the like. Some techniques may involve other coating methods such as physical/chemical vapor deposition, thermal spray, electrodeposition, and molecular beam epitaxy, and others of the like. The multi-layered alloy 300 may further be deposited on various steels or alloys to increase resistance to hydrogen-induced cracking in a downhole environment.

Figure 4:
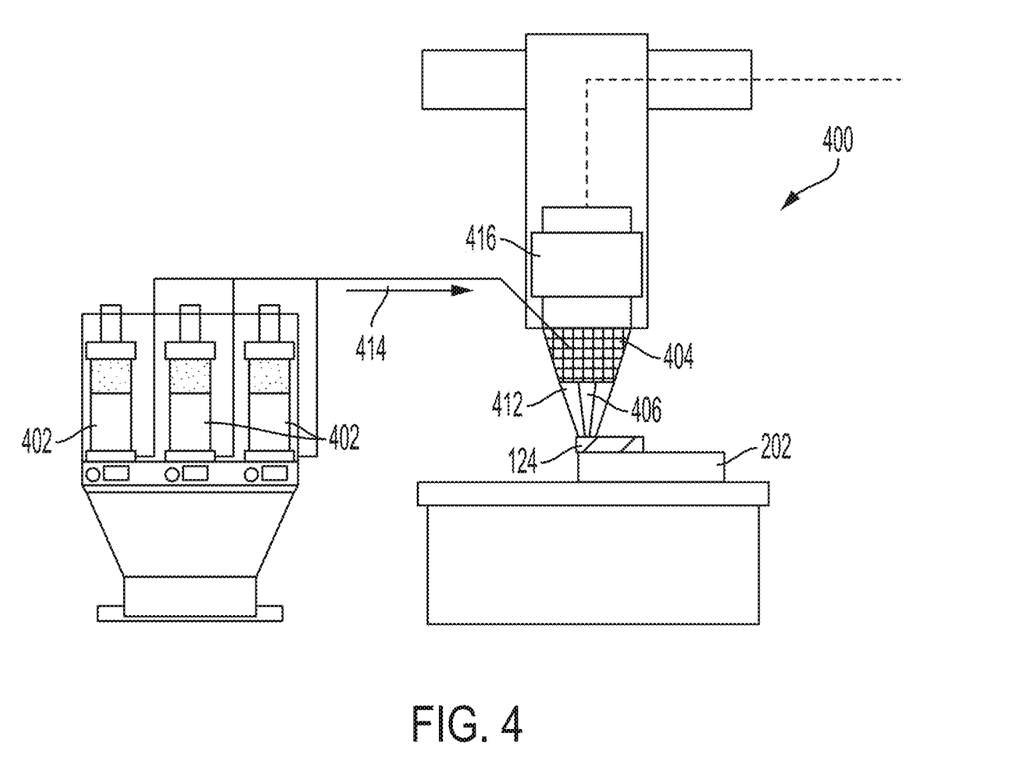
FIG. 4 is a schematic of an example of a directed energy deposition system for coating an external surface of a metallic substrate with a high-entropy alloy according to one example of the present disclosure.

FIG. 4 is a schematic of an example of a directed energy deposition system 400 for coating an external surface of a metallic substrate 202 with a high-entropy alloy coating 124 according to one example of the present disclosure. The directed energy deposition system 400 may be configured to generate the high-entropy alloy coating 124 onto the metallic substrate 202 to produce an alloy layer resistant to hydrogen-induced cracking in a downhole environment. The directed energy deposition system 400 may be configured to produce the high-entropy alloy coating 124 onto the external surface of the metallic substrate 202 layer-by-layer. The powder feeder 402 may include any suitable size, height, shape, and any combinations thereof. The powder feeder 402 may also include any suitable materials such as metals, nonmetals, polymers, composites, and any combinations thereof. In certain examples, the powder feeder 402 may be configured to house or contain one or more powders that may provide the one or more powders to the laser head. Any suitable type of material in a powder form may be utilized as the one or more powders. The powders may include chromium, nickel, cobalt, aluminum, iron, derivations thereof, and any combination thereof.

The laser head 416 may be configured to receive the one or more powders and a suitable gas to produce the high-entropy alloy coating 124 where the suitable gas may include argon or other similar gases. The powder feeder 402 may output 414 the one or more powders in conjunction with the suitable gas to the laser head 416 through a process of atomization. The laser head 416 may funnel the received one or more powders into a powder feeding nozzle 404 where the powder is heated by a laser 406. The laser may contain parameters that are optimized to reduce porosity and residual stress of the high-entropy alloy coating 124. The molten powder 412 may then be directed onto the external surface of the metallic substrate 202. As the directed energy deposition system 400 operates, the high-entropy alloy coating 124 may be produced by layering a molten alloy of a powder source sequentially.

Figure 5:
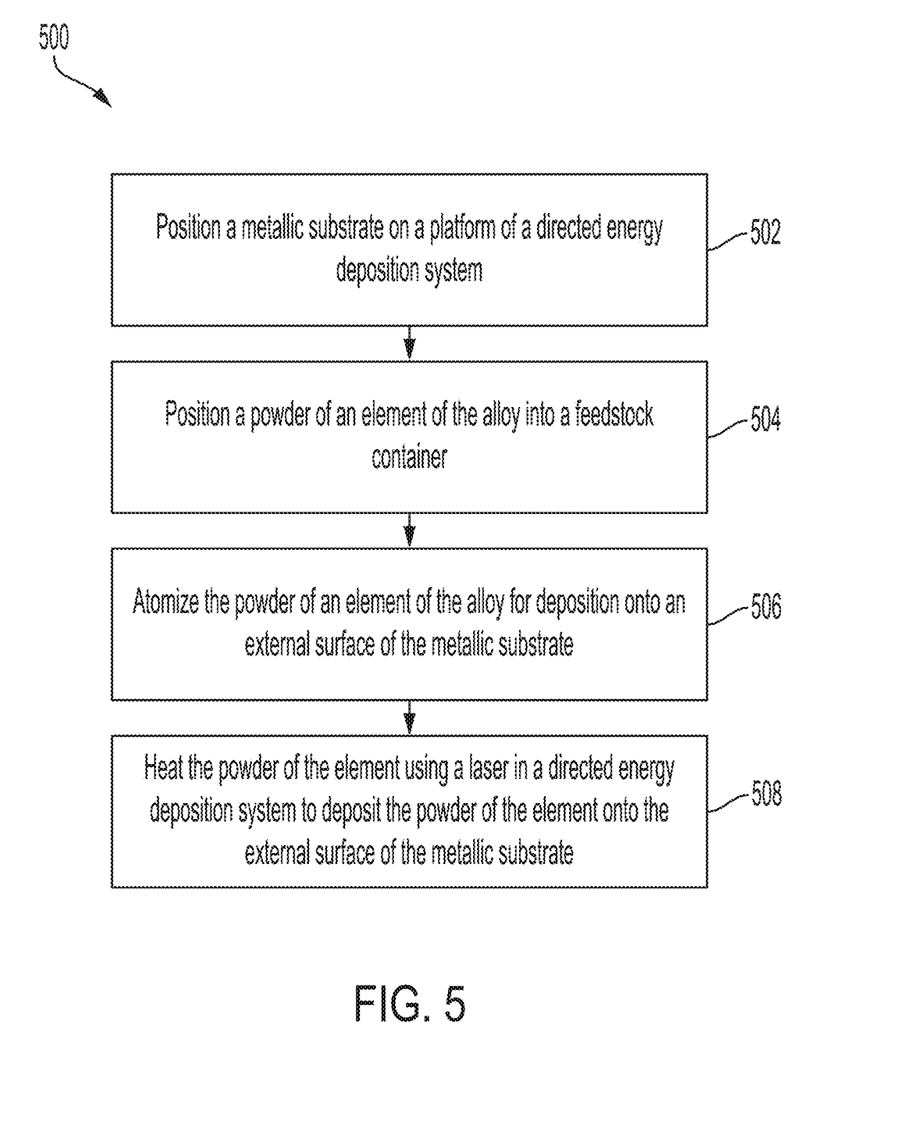
FIG. 5 is a flowchart of a process for forming a coating of a high-entropy alloy on an external surface of a metallic substrate with a directed energy deposition system according to one example of the present disclosure.

FIG. 5 is a flowchart of a process 500 for forming a coating of a high-entropy alloy on an external surface of a metallic substrate 202 using a directed energy deposition system 400 according to one example of the present disclosure. At block 502, the metallic substrate 202 is positioned on a platform of a directed energy deposition system 400. The metallic substrate 202 may be a low-alloy, high-strength steel component that may be susceptible to cracking due to exposure to hydrogen. Examples of materials of other metallic substrates may include stainless-steels, carbon-steels, nickel-based superalloys, and other alloy steels of the like. The metallic substrate 202 may have a lower entropy than the high-entropy alloy coating 124. According to some examples, by using the high-entropy alloy coating 124 on an external surface of the metallic substrate 202, cracking of the metallic substrate 202 in a wellbore or downhole environment can be eliminated. Hydrogen diffusion can be suppressed through employing properties of high-entropy alloys. In on example, the high-entropy alloy coating 124 may be formed using the directed energy deposition system 400.

At block 504, a powder form of an element of an alloy is positioned into a feedstock container prior to initiation of directed deposition. The powder form of an element may include an alloy mixture or a pre-alloy powder of any of nickel, aluminum, cobalt, chromium, iron. In one example of the present disclosure, the alloy powder may be deposited directly into the laser head 416 to be heated prior to depositing onto the surface of the metallic substrate 202. Other examples may deposit the alloy powder directly onto the surface of the metallic substrate 202 prior to heating. After positioning the powder form of the alloy or pre-alloy into the feedstock container, in one example, the powder may be atomized and directed to the laser head to initiate deposition.

At block 506, the powder of an element of the alloy is atomized for deposition on the surface of the metallic substrate 202. For example, the powder form of the alloy metals may be atomized to be outputted 414 from the feedback stock container to the powder feeding nozzle 404 using a gas, preferably argon. A heat sources such as a laser, may be used to heat the powder of the alloy in the powder feeding nozzle 404. The molten powder may then be deposited onto the external surface of a metallic substrate 202. While heating may be involved, the microstructure and bulk mechanical properties of the metallic substrate 202 may not be affected during a deposition process. Other systems and methods that may be used includes selective laser melting, selective laser sintering, electron beam melting, or cold spraying. Directed energy deposition may be optimal for avoiding a post-processing heating step that may enervate the surface or subsurface of the metallic substrate 202.

At block 508, the powder form of the element is heated using a laser in a directed energy deposition system to deposit the powder of the element onto the external surface of the metallic substrate 202. Upon deposition, the high-entropy alloy coating 124 may form strong metallurgical bonds with the metallic substrate 202. Further, the high-entropy alloy coating 124 may be deposited in a face-centered cubic crystal lattice structure that may allow for tighter packing densities than other lattice structures. Alternatively, the multi-layer alloy may be formed sequentially on the metallic substrate 202. Heat treatment following deposition can be avoided to maintain integrity of microstructure.

As used below, any reference to a series of examples is to be understood as a reference to each of those examples disjunctively (e.g., "Examples 1-4" is to be understood as "Examples 1, 2, 3, or 4"). In some aspects, a metal and a method for generating a high-entropy alloy coating are provided according to one or more of the following examples:

Example 1 is a metal comprising: a metallic substrate; and an alloy having an entropy that is greater than the entropy of the metallic substrate and that coats an external surface of the metallic substrate to increase resistance of the metal to hydrogen-induced cracking in a downhole environment.

Example 2 is the metal of example(s) 1, wherein the alloy comprises at least five metal elements that are organized in a face-centered cubic crystal lattice structure and wherein the entropy of the alloy is in a range of 10 J/mol*K to 20 J/mol*K.

Example 3 is the metal of example(s) 1, wherein the entropy of the alloy corresponds to a stacking fault energy in a range of 25 mJ/m2 to 400 mJ/m2.

Example 4 is the metal of example(s) 1, wherein the alloy comprises nickel, aluminum, cobalt, chromium, and iron, wherein each of nickel, cobalt, chromium, and iron is 5 atomic weight percent or greater, and wherein aluminum is 6.6 atomic weight percent or greater.

Example 5 is the metal of example(s) 4, wherein the alloy comprises boron and aluminum to cause a crystal lattice distortion, wherein boron is in a range of 0.01 atomic weight percent to 0.25 atomic weight percent.

Example 6 is the metal of example(s) 1, wherein the alloy on the metallic substrate is configured to reduce coherent twin boundaries by increasing a stacking fault energy from the metallic substrate to the alloy to prevent crack formation in the metallic substrate.

Example 7 is the metal of example(s) 1, wherein the alloy coats at least a majority of the external surface of the metallic substrate such that the alloy is between the majority of the external surface of the metallic substrate and hydrogen in the downhole environment when it is positioned downhole.

Example 8 is the metal of example(s) 1, wherein the alloy comprises at least five metal elements that are organized in a body-centered cubic crystal lattice structure wherein the at least five metal elements are present in equimolar concentrations.

Example 9 is the metal of example(s) 1, wherein the alloy comprises: a first layer exposed to hydrogen; and a second layer between the first layer and the metallic substrate, wherein the entropy of the second layer is lower than the entropy of the first layer and is higher than the entropy of the metallic substrate.

Example 10 is the metal of example(s) 9, wherein the second layer between the first layer and the metallic substrate comprises nickel, chromium, vanadium, and cobalt in equimolar proportion.

Example 11 is the metal of example(s) 1, wherein the alloy is usable for coating tools and components positioned downhole in hydrogen storage wells, salt caverns, gas storage tanks, or wellbores for extracting hydrocarbons.

Example 12 is the metal of example(s) 1, wherein the alloy that coats the external surface of the metallic substrate is formable on the external surface by depositing the alloy on the external surface of the metallic substrate using a deposition system with respect to which the metallic substrate is positioned.

Example 13 is a method comprising: positioning a metallic substrate on a deposition system; depositing an alloy onto an external surface of the metallic substrate, wherein the alloy has an entropy that is greater than the entropy of the metallic substrate; and forming an alloy that coats on the external surface of the metallic substrate to increase resistance of the metallic substrate to hydrogen-induced cracking in a downhole environment.

Example 14 is the method of example(s) 13, wherein the alloy comprises at least five metal elements that are organized in a face-centered cubic crystal lattice structure and wherein the entropy of the alloy is in a range of 10 J/mol*K to 20 J/mol*K.

Example 15 is the metal of example(s) 13, wherein the entropy of the alloy corresponds to a stacking fault energy in a range of 25 mJ/m2 to 400 mJ/m2.

Example 16 is the metal of example(s) 13, wherein the alloy comprises nickel, aluminum, cobalt, chromium, and iron, wherein each of nickel, cobalt, chromium, and iron is 5 atomic weight percent or greater, and wherein aluminum is 6.6 atomic weight percent or greater.

Example 17 is the method of example(s) 16, wherein the alloy comprises boron and aluminum to cause a crystal lattice distortion, wherein boron is in a range of 0.01 atomic weight percent to 0.25 atomic weight percent.

Example 18 is the method of example(s) 13, wherein forming the alloy that coats the external surface of the metallic substrate comprises: positioning a powder of an element of the alloy into a feedstock container; using a gas to atomize the powder of the element; deploying the powder of the element through a nozzle; and heating the powder of the element using a laser in a directed energy deposition process for depositing the powder of the element onto the external surface of the metallic substrate.

Example 19 is the method of example(s) 18, wherein heating the powder of the element excludes a post-deposition heat treatment such that integrity of microstructure is maintained.

Example 20 is the method of example(s) 13, wherein depositing the alloy onto the external surface of the metallic substrate includes selective laser melting, selective laser sintering, electron beam melting, or cold spraying.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:
1. A layered metal comprising:
a metallic substrate; and
a coating that coats an external surface of the metallic substrate to increase resistance of the metallic substrate to hydrogen-induced cracking in a downhole environment, the coating comprising:
a first layer that is exposed to hydrogen and that comprises a nanomaterial or a ceramic material;
a second layer between the first layer and a third layer; and
the third layer between the second layer and the metallic substrate, wherein a first entropy of the third layer is lower than a second entropy of the second layer, and wherein the first entropy is higher than a third entropy of the metallic substrate.

2. The layered metal of claim 1, wherein the second layer comprises at least five metal elements that are organized in a face-centered cubic crystal lattice structure and wherein the second entropy of the second layer is in a range of 10 J/mol*K to 20 J/mo*K.

3. The layered metal of claim 2, wherein the second entropy of the second layer corresponds to a stacking fault energy in a range of 25 mJ/m² to 400 mJ/m².

4. The layered metal of claim 1, wherein the second layer comprises nickel, aluminum, cobalt, chromium, and iron, wherein each of nickel, cobalt, chromium, and iron is 5 atomic weight percent or greater with respect to the a total atomic weight of the second layer, and wherein aluminum is 6.6 atomic weight percent or greater with respect to the total atomic weight of the second layer.

5. The layered metal of claim 4, wherein the second layer comprises boron and aluminum to cause a crystal lattice distortion, wherein boron is in a range of 0.01 atomic weight percent to 0.25 atomic weight percent with respect to the total atomic weight of the second layer.

6. The layered metal of claim 1, wherein the second layer on the metallic substrate is configured to reduce coherent twin boundaries by increasing a stacking fault energy from the metallic substrate to the second layer to prevent crack formation in the metallic substrate.

7. The layered metal of claim 1, wherein the coating coats at least a majority of the external surface of the metallic substrate such that the coating is between the majority of the external surface of the metallic substrate and hydrogen in the downhole environment when the layered metal is positioned downhole.

8. The layered metal of claim 1, wherein the second layer comprises at least five metal elements that are organized in a body-centered cubic crystal lattice structure wherein the at least five metal elements are present in equimolar concentrations.

9. The layered metal of claim 1, wherein the third layer between the second layer and the metallic substrate comprises nickel, chromium, vanadium, and cobalt in equimolar proportion.

10. The layered metal of claim 1, wherein the coating is usable for coating tools and components positioned downhole in hydrogen storage wells, salt caverns, gas storage tanks, or wellbores for extracting hydrocarbons.

11. The layered metal of claim 1, wherein the coating that coats the external surface of the metallic substrate is formable on the external surface by depositing the coating on the external surface of the metallic substrate using a deposition system with respect to which the metallic substrate is positioned.

12. A method comprising:
positioning a metallic substrate on a deposition system;
depositing a coating onto an external surface of the metallic substrate, the coating comprising:
a first layer that is exposed to hydrogen and that comprises a nanomaterial or a ceramic material;
a second layer between the first layer and a third layer; and
the third layer between the second layer and the metallic substrate, wherein a first entropy of the third layer is lower than a second entropy of the second layer and is higher than a third entropy of the metallic substrate; and
forming the coating that coats on the external surface of the metallic substrate to increase resistance of the metallic substrate to hydrogen-induced cracking in a downhole environment.

13. The method of claim 12, wherein the second layer comprises at least five metal elements that are organized in a face-centered cubic crystal lattice structure and wherein the second entropy of the second layer is in a range of 10 J/mol*K to 20 J/mo*K.

14. The method of claim 12, wherein the second entropy of the second layer corresponds to a stacking fault energy in a range of 25 mJ/m² to 400 mJ/m².

15. The method of claim 12, wherein the second layer comprises nickel, aluminum, cobalt, chromium, and iron, wherein each of nickel, cobalt, chromium, and iron is 5 atomic weight percent or greater with respect to a total atomic weight of the second layer, and wherein aluminum is 6.6 atomic weight percent or greater with respect to the total atomic weight of the second layer.

16. The method of claim 15, wherein the second layer comprises boron and aluminum to cause a crystal lattice distortion, wherein boron is in a range of 0.01 atomic weight percent to 0.25 atomic weight percent with respect to the total atomic weight of the second layer.

17. The method of claim 12, wherein forming the coating that coats the external surface of the metallic substrate comprises:
positioning a powder of an element of the coating into a feedstock container;
using a gas to atomize the powder of the element;
deploying the powder of the element through a nozzle; and
heating the powder of the element using a laser in a directed energy deposition process for depositing the powder of the element onto the external surface of the metallic substrate.

18. The method of claim 17, wherein heating the powder of the element excludes a post-deposition heat treatment such that integrity of microstructure is maintained.

19. The method of claim 12, wherein depositing the coating onto the external surface of the metallic substrate includes selective laser melting, selective laser sintering, electron beam melting, or cold spraying.

* * * * *